US 11,799,755 B2

(12) United States Patent
Dawani et al.

(10) Patent No.: US 11,799,755 B2
(45) Date of Patent: Oct. 24, 2023

(54) METADATA-BASED CROSS-REGION SEGMENT ROUTING

(71) Applicant: Amazon Technologies, Inc., Seattle, WA (US)

(72) Inventors: Anoop Dawani, Redmond, WA (US); Bashuman Deb, Aldie, VA (US); Baihu Qian, Chicago, IL (US); Omer Hashmi, Bethesda, MD (US); Nick Matthews, Westminster, CO (US); Shridhar Kulkarni, Seattle, WA (US); Thomas Nguyen Spendley, Rockville, MD (US); Indira Radhika Pulla, Aldie, VA (US); David Jonathan Adams, Springfield, VA (US); Nicholas Ryan Lombardi, Ashburn, VA (US); Brandon Michael LaRue, Herndon, VA (US); Aaron Scott DeBruin, Germantown, MD (US); Ramin Ali Dousti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 17/456,549

(22) Filed: Nov. 24, 2021

(65) Prior Publication Data

US 2023/0164059 A1    May 25, 2023

(51) Int. Cl.
*H04L 45/00* (2022.01)
*H04L 45/02* (2022.01)
(Continued)

(52) U.S. Cl.
CPC .............. *H04L 45/04* (2013.01); *H04L 45/02* (2013.01); *H04L 45/306* (2013.01); *H04L 45/44* (2013.01);
(Continued)

(58) Field of Classification Search
CPC ......... H04L 45/00; H04L 45/02; H04L 45/04; H04L 45/302; H04L 45/306;
(Continued)

(56) References Cited

U.S. PATENT DOCUMENTS 5,361,256 A * 11/1994 Doeringer ........... H04L 12/1836
370/390
5,819,071 A    10/1998 Mazer
(Continued)

FOREIGN PATENT DOCUMENTS

| CN | 110557316 | * | 6/2021 | ............. H04L 27/26 |
|---|---|---|---|---|
| EP | 3681110 A1 | | 7/2020 | |
| WO | WO 2015/179508 A1 | | 11/2015 | |

OTHER PUBLICATIONS

International Search Report and Written Opinion dated Feb. 27, 2023 in PCT Application No. PCT/US2022/050214 in 17 pages.

*Primary Examiner* — Warner Wong
(74) *Attorney, Agent, or Firm* — Knobbe, Martens, Olson & Bear, LLP

(57) ABSTRACT

Systems and methods are provided for management of network segments that cross geographic regions and/or other types of network divisions in a cloud-based network environment. Gateway may manage traffic across regions using routing metadata that includes a segment identifier. The gateways may also signal their routes across regions based on segment data, and implement the signaled routes using segment-based routing policies. Route selection may be performed using optimization data.

20 Claims, 11 Drawing Sheets

(51) Int. Cl.
*H04L 45/302* (2022.01)
*H04L 45/44* (2022.01)
*H04L 9/40* (2022.01)
*H04L 45/50* (2022.01)
*H04L 45/021* (2022.01)
*H04L 41/0895* (2022.01)
*H04L 49/00* (2022.01)

(52) U.S. Cl.
CPC ........ *H04L 45/566* (2013.01); *H04L 41/0895* (2022.05); *H04L 45/021* (2013.01); *H04L 45/507* (2013.01); *H04L 49/3009* (2013.01); *H04L 63/0272* (2013.01)

(58) Field of Classification Search
CPC . H04L 45/3065; H04L 45/566; H04L 45/586; H04L 63/02; H04L 63/0272; H04L 12/4641; H04L 12/4645; H04L 2012/5621; H04L 41/0895; H04L 45/021; H04L 45/50; H04L 45/507; H04L 45/76; H04L 45/655; H04L 45/3009; H04L 47/805
See application file for complete search history.

(56) References Cited

U.S. PATENT DOCUMENTS

| | | |
|---|---|---|
| 6,505,228 B1 | 1/2003 | Schoening et al. |
| 8,880,690 B1 | 11/2014 | Kennedy et al. |
| 9,065,738 B2 | 6/2015 | Ennis, Jr. et al. |
| 10,833,992 B1 | 11/2020 | Dickinson |
| 11,310,155 B1 | 4/2022 | Qian et al. |
| 2003/0189919 A1 | 10/2003 | Gupta et al. |
| 2005/0182839 A1* | 8/2005 | Geoffrion ............... H04L 45/04 709/227 |
| 2015/0372857 A1 | 12/2015 | Hasan et al. |
| 2016/0014025 A1* | 1/2016 | Wang ..................... H04L 45/66 370/392 |
| 2016/0218947 A1* | 7/2016 | Hughes ................... H04J 11/00 |
| 2016/0294631 A1 | 10/2016 | Byrnes et al. |
| 2016/0337206 A1 | 11/2016 | Bugenhagen et al. |
| 2017/0116038 A1 | 4/2017 | Netto et al. |
| 2018/0375760 A1* | 12/2018 | Saavedra ........... H04L 12/4633 |
| 2019/0089620 A1* | 3/2019 | Hefel ..................... H04L 45/02 |
| 2019/0312790 A1 | 10/2019 | Hinrichs et al. |
| 2020/0092193 A1 | 3/2020 | Tillotson et al. |
| 2020/0162282 A1 | 5/2020 | Ashaputre et al. |
| 2020/0162362 A1 | 5/2020 | Deb et al. |
| 2020/0162407 A1 | 5/2020 | Tillotson |
| 2020/0169534 A1 | 5/2020 | Fritz et al. |
| 2020/0213224 A1 | 7/2020 | Cheng et al. |
| 2020/0374201 A1 | 11/2020 | Wang et al. |
| 2021/0011466 A1 | 1/2021 | Kephart, Jr. et al. |
| 2021/0306265 A1* | 9/2021 | K A ....................... H04L 45/04 |
| 2021/0328977 A1 | 10/2021 | Luo et al. |
| 2021/0392047 A1 | 12/2021 | Jamkhedkar et al. |
| 2022/0029891 A1 | 1/2022 | Wright et al. |
| 2023/0028947 A1 | 1/2023 | Ritter |
| 2023/0164076 A1* | 5/2023 | Dawani ............... H04L 12/4641 709/238 |

\* cited by examiner

METADATA-BASED CROSS-REGION SEGMENT ROUTING

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical virtualization host to be shared among multiple users by providing each user with one or more "guest" virtual machines hosted by the single virtualization host.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
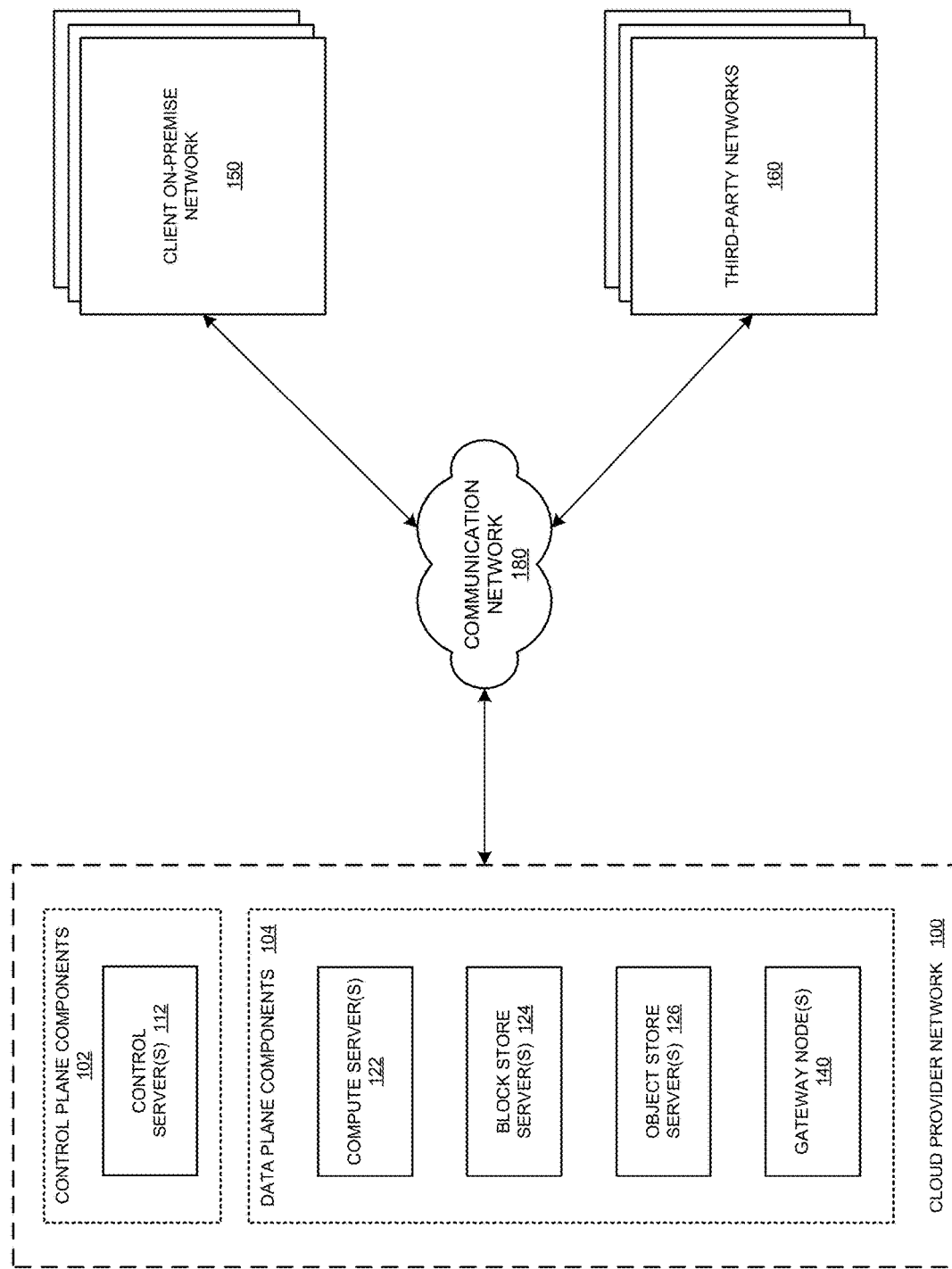
FIG. 1 is a block diagram depicting an illustrative network environment in which cross-region segment management and routing may be implemented according to some embodiments.

Generally described, the present disclosure relates to management of network segments that cross geographic regions and/or other types of network divisions in a cloud-based network environment. Beneficially, this enables a cloud-based network provider's geographically-dispersed network infrastructure to serve as the core of multiple clients' distributed networks, where those clients can define expansive yet isolated segments to which other networks (virtual private clouds, virtual private networks, etc.) may be attached. The various segments may remain logically isolated from each other even when implemented across some or all of the same regions—and using the same physical and/or virtual routing components—as other segments of the same client and/or other clients.

Some conventional cloud-based network providers provide clients with access to shared, geographically-dispersed network infrastructure. For example, virtualized compute instances, distributed storage systems, virtual private clouds ("VPCs"), and the like may be hosted within the shared network infrastructure. As another example, clients may connect their on-premise networks to the shared network infrastructure of a cloud-based network provider over a direct physical link (e.g., a "direct connection"), through a software-defined wide area network ("SD-WAN"), through a virtual private network ("VPN") tunnel, or the like. Within the shared network infrastructure, networking and interconnectivity-related features may be provided to meet the requirements of applications being implemented using services hosted in the infrastructure. For example, routers or other gateways in different, distinct geographic regions or other physical and/or logical divisions of the network architecture may be peered such that they share routing data and provide end-to-end routing throughout the shared network infrastructure in a manner that is transparent to clients. However, due to physical and/or logical separation of the network into regions or other divisions, it may be difficult or impossible to provide cross-region isolated segmentation of traffic using conventional routers and configurations.

Some aspects of the present disclosure address some or all of the issues noted above, among others, by providing systems and methods to implement isolated segments that span regions or other network divisions. A virtual private cloud-based global wide area network (also referred to as a "VPC global WAN" or simply "VPC-WAN" for brevity) may be configured within a cloud-based network provider's shared network infrastructure (also referred as a "cloud provider network"). The VPC-WAN may be considered "private" in the sense that it is separated from any other traffic and/or clients (including but not limited to other VPC-WANs) sharing the same cloud provider network.

Thus, the VPC-WAN may also be referred to more generally as a "private wide area network," or as an example of a "private network." The VPC-WAN may be considered "virtual" and "cloud-based" in the sense that it is implemented on top of the cloud-based network provider's shared network infrastructure rather than being implemented on separate infrastructure of a client.

The VPC-WAN may be configured using network policy data that defines various aspects. For example, the network policy data may define regions encompassed by the VPC-WAN, segments that may span multiple regions within the VPC-WAN but remain isolated or substantially isolated from each other, the manner in which isolated networks (VPCs, VPNs, SD-WANs, direct connections to on-premise client networks, etc.) are to be attached to segments, and the like. Thus, a VPC-WAN may span multiple regions of the cloud provider network, and may include any number of isolated networks that may be hosted within the cloud provider network's physical data centers (e.g., VPCs) or may be physically external to the cloud provider's data centers (e.g., on-premise client networks or third-party networks communicating with the cloud provider network via VPN, SD-WAN, direct connections, etc.). This allows client traffic originating from one endpoint to be transmitted to another endpoint of the VPC-WAN regardless of whether one or both endpoints are within or external to the cloud provider network's physical data centers. Moreover, a client may segment traffic of a VPC-WAN by defining segments within the network policy data using one or more rules for attachment of isolated networks to the segments. For example, a rule for a particular segment may specify that attachments associated with a particular tag are to be automatically associated with the segment. In some embodiments, other rules, attributes, and the like may be specified in the policy data. For example, rules requiring authorization to attach an isolated network to a given segment, rules maintaining isolation of all attachments to a given segment, rules regarding resources to be shared among otherwise isolated attachments or segments, or the like may be defined.

Additional aspects of the present disclosure relate to methods of signaling segment-specific routing data between gateways in different regions or other network divisions. These methods facilitate formation of a cross-region segment from a group of region-specific segments, while ensuring traffic in one such cross-region segment remains isolated from traffic in another cross-region segment even if both segments share some or all of the same regions, gateways, etc. When a route table or other routing data is generated within a region for a region-specific segment, and where that region-specific segment is to be part of a cross-region segment, the routes in the region-specific route table may be signaled to other regions in connection with a region-specific segment identifier. Other gateways in other regions may obtain the route table data and add it to their own segment-specific route tables. In this way, the gateways may build up tables of routing data for all regions of a given segment. Use of the segment identifiers allows routers to maintain different route tables for different segments. Thus, within a given region, a single gateway (e.g., a router or system of routers) may route traffic for multiple segments in the region, while also maintaining isolation between the segments by not sharing routes across segments (unless otherwise permitted or specified).

Further aspects of the present disclosure relate to using packet header metadata to implement policy-based routing. At layer 3 of the of the open systems interconnection ("OSI") model, some networks perform routing operations using packet headers that include a 5-tuple of metadata: source address, such as an internet protocol ("IP") address for the sender of the packet; destination address, such as an IP address for the intended destination of the packet; source port, such as the sender's transmission control protocol ("TCP") or user datagram protocol ("UDP") port from which the packet originated; destination port, such a TCP or UDP port of the intended destination of the packet; and protocol to be used. In some embodiments, to facilitate routing of traffic in a given segment across regions while maintaining isolation among different segments, additional metadata may be added to a packet header to indicate the segment of the source of the packet. For example, the layer 3 packet header may be expanded to a 6-tuple of metadata for routing, with the additional metadata item being a segment identifier. The additional metadata item may be added to the header by a gateway or the sender of the packet (e.g., by the host device from which the packet originates, by a virtual machine instance or hypervisor executing on the host device, etc.). A policy may be implemented at the gateway such that when a packet is received, the gateway may evaluate the segment identifier and determine which routing data (e.g., segment-specific route table) to use to route the packet. In this way, a single gateway or system of gateways within a given region may be able to resolve the segment to which the packet belongs, and route traffic for multiple segments that include the region while also maintaining isolation between the segments by using segment-specific route information.

Additional aspects of the present disclosure relate to using metadata and/or metrics to select a particular path to a particular destination, among all available paths to the destination. In some embodiments, when a gateway is selecting a path to update a route table, the gateway may use a dynamic, optimized best path selection between any two points based on multiple factors, such as: number of hops, physical distance between each hop, network latency between each hop, packet loss between each hop, jitter between each hop, link utilization between each hop, or the like.

Various aspects of the disclosure will now be described with regard to certain examples and embodiments, which are intended to illustrate but not limit the disclosure. Although aspects of some embodiments described in the disclosure will focus, for the purpose of illustration, on particular examples of network regions, divisions, segments, metadata, gateways, and signaling protocols, the examples are illustrative only and are not intended to be limiting. In some embodiments, the techniques described herein may be applied to additional or alternative network regions, divisions, segments, metadata, gateways, signaling protocols, and the like. Any feature used in any embodiment described herein may be used in any combination with any other feature, without limitation.

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), any number of client on-premise networks 150 (also referred to herein simply as "on-premise networks" for convenience) external to the cloud provider network 100, and any number of third-party networks 160 external to the cloud provider network 100. The cloud provider network 100, on-premise networks 150, and third-party networks 160 may communicate with each over via a communication network 180, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of central processor units ("CPUs") and graphics processing unites ("GPUs"), optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their clients or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients can connect to availability zones of the cloud provider network via a publicly accessible network (e.g., the Internet, a cellular communication network). Transit Centers ("TC") are the primary backbone locations linking clients to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a client network that hosts client resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 100 (e.g., computing instances, containers, block storage volumes, databases, file storage, etc., as described in greater detail below). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

In some embodiments, the data plane may include one or more gateway nodes 140 configured to implement aspects of the present disclosure for routing data packets through the cloud provider network 100 from sources to destinations. A gateway node 140 may be implemented on a device (e.g., router, server, etc.) or set of devices separate from storage servers and compute servers of the data plane 104. In some embodiments, a gateway node 140 may share one or more virtualized servers with storage or compute servers. In some embodiments, gateway nodes 140 or certain modules or components thereof may be part of the control plane such that they are control plane components 102.

Some clients may desire to use the resources and services of the cloud provider network 100, but for various reasons (e.g., latency in communications with client devices, legal compliance, security, or other reasons) prefer for these resources and services to be provisioned within their own network, for example on premises of the client. A piece of the cloud provider network—referred to herein as a "provider substrate extension" or PSE—may be provisioned within the client's network. A client may access their PSE via the cloud provider network 100 or their own network, and may use the same APIs to create and manage resources in the PSE as they would use to create and manage resources in the cloud provider network 100 region.

The PSE may be pre-configured, e.g., by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the client network. As described above, the cloud provider network 100 may offer a set of predefined instance types, each having varying types and quantities of underlying hardware resources. Each instance type may also be offered in various sizes. In order to enable clients to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to client devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a client workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a client or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the client who owns the premises (and any other accounts allowed by the client). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with client resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to client devices and/or workloads.

Figure 2:
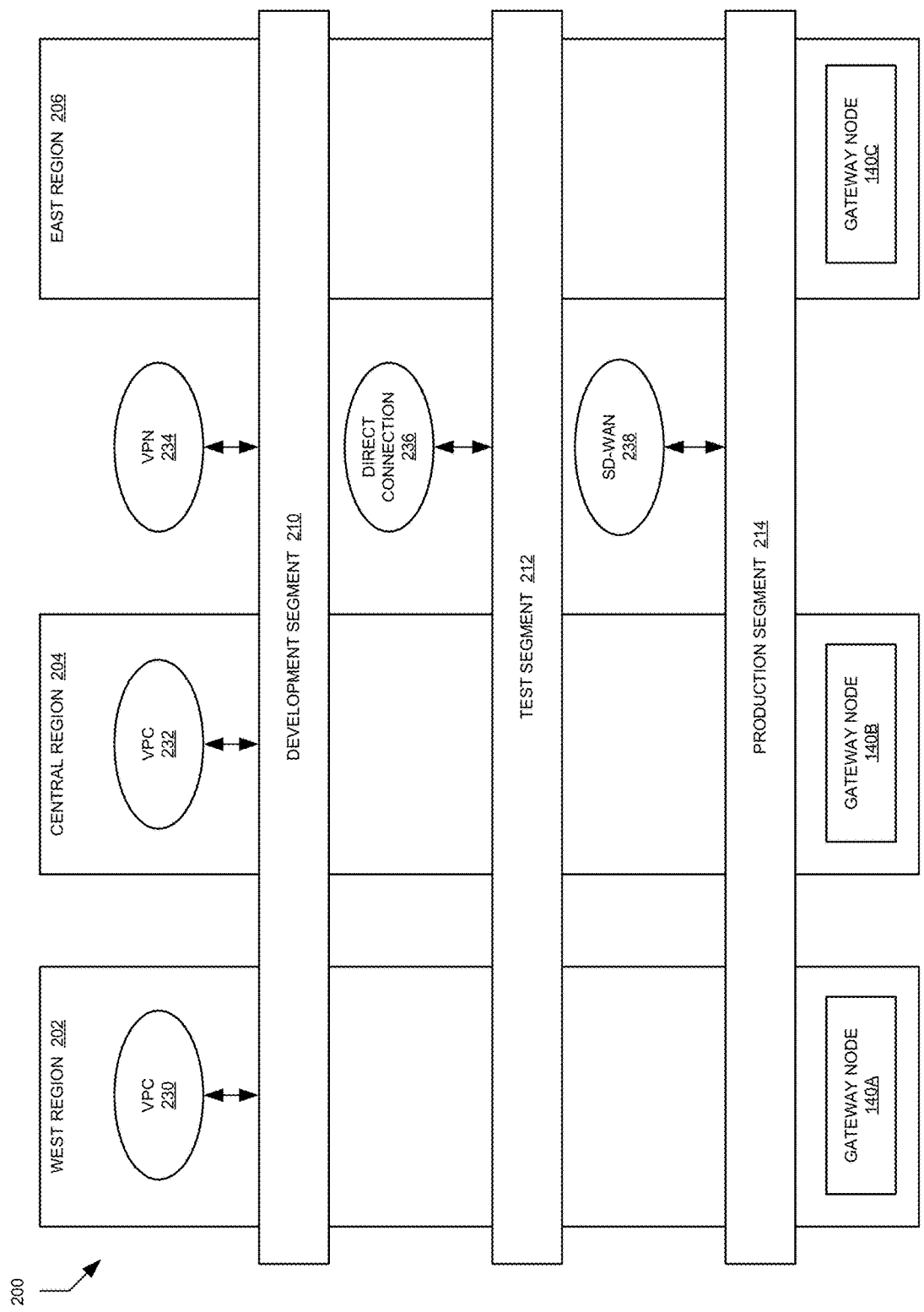
FIG. 2 is a block diagram depicting an illustrative cloud-based virtual private wide area network including multiple regions, segments, and attached isolated networks according to some embodiments.

FIG. 2 illustrates an example of a VPC-WAN 200 implemented at least in part using hardware and services of the cloud provider network 100. The example VPC-WAN 200 encompasses multiple regions of the cloud provider network 100: west region 202, central region 204, and east region 206. As described herein, each region may be implemented as an autonomous system in a different geographic location than each other region. For example, the hardware components of each region may be located in a physically separate data center in a geographically different region of the world than the hardware components of each of the other regions.

To facilitate cross-region communication, each region may include one or more gateway nodes. The gateway nodes may serve as routers to forward packet traffic originating inside the corresponding region to another region in which the packet destination may be located or which may be closer, from a networking perspective, to the destination. Gateway nodes may also serve as routers to forward packet traffic originating outside the corresponding region (e.g., traffic originating from another region) to a destination inside the region, or to another region.

In the illustrated example, west region 202 is shown having gateway node 140A, central region 204 is shown having gateway node 140B, and east region 206 is shown having gateway node 140C. However, the example is for purposes of illustration only, and is not meant to be limiting, required, or exhaustive. In some embodiments, a VPC-WAN 200 may have additional, fewer, and/or alternative regions. In some embodiments, a given region may have two or more gateway nodes (e.g., one or more gateway nodes in each availability zone of the region). In some embodiments, one region may have a different number of gateway nodes and/or AZs.

The VPC-WAN 200 has been segmented into different segments: a development segment 210, a test segment 212, and a production segment 214. The segments remain isolated from each other even though they each encompass the same regions. Conventionally, because the segments cross regional boundaries and encompass the same regions, it would be difficult or impossible to maintain isolation of the segment traffic without also using separate routers or other gateways for each segment. Advantageously, by tagging packets with segment identifiers and using separate routing data for each segment as described in greater detail below, a single gateway node may maintain isolation of segment-specific traffic for multiple segments within a region, and segment traffic may remain isolated from other traffic of other segments even when crossing regions.

Segments may be used to isolate various portions of the VPC-WAN 200 from each other, and/or to facilitate ease of communication between different portions of the VPC-WAN 200 even across regions. The segment construct may be particularly useful when incorporating isolated networks into the VPC-WAN. The process of incorporating an isolated network into a VPC-WAN may be referred to as "attaching" the isolated network, and the attached isolated network may be referred to as an "attachment."

Isolated networks may be implemented within the cloud provider network 100 (e.g., within one or more regions), or may be implemented external from the cloud provider network 100 (e.g., at an on-premise client network 150 or a third-party network 160). For example, the client managing the VPC-WAN 200 may implement a VPC 230 within west region 202. As another example, a second client may implement VPC 232 within central region 204, and may be permitted to attach the VPC 232 to a segment of the first client's VPC-WAN 200 (e.g., the development segment 210). As another example, the client may attach an on-premise network 150 via a VPN 234 (shown attached to development segment 210), direct connection 236 (shown attached to test segment 212), and/or SD-WAN 238 (shown attached to production segment 214). As a further example, a second client may attach a third-party network 150 via a VPN 234, direct connection 236, or SD-WAN 238.

Figure 3:
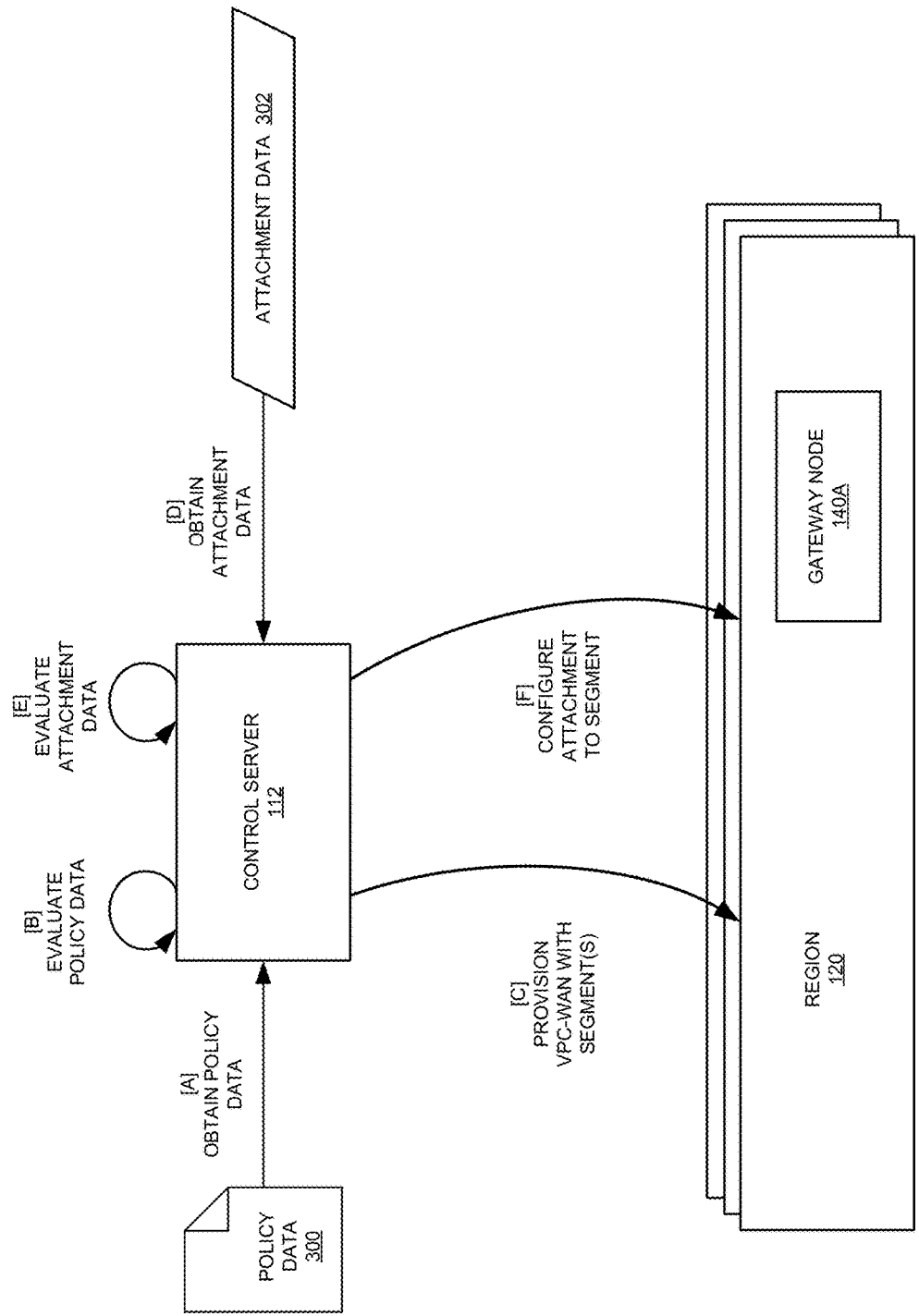
FIG. 3 is a block diagram of illustrative data flows and interactions to provision and manage a segment according to some embodiments.

FIG. 3 illustrates example data flows and interactions between a control server 112 and other components of a cloud provider network 100 to provision a VPC-WAN, define segments of the VPC-WAN, and attach isolated networks to the VPC-WAN.

At [A], the control serer 112 may receive or otherwise obtain policy data 300 for configuring a VPC-WAN. The policy data 300 may include metadata describing attributes of the VPC-WAN to be configured. For example, the policy data 300 may include details regarding the regions of the cloud provider network to be encompassed by the VPC-WAN, gateway node configuration information, segments to be defined within the VPC-WAN, routing behavior for the segments, and/or an attachment policy defining how attachments are to be mapped to segments. In some embodiments, the policy data 300 may be obtained in a standardized format, such as a JavaScript Object Notation ("JSON") document, an Extensible Markup Language ("XML") document, YAML Ain't Markup Language ("YAML") data, or the like.

Table 1 below provides an example of policy data 300 represented as a JSON document. Some portions of the example document use the placeholder "<data>" for entire sections or for values of individual keys within a section.

TABLE 1

```
{
    "version": <data>,
    "core-network-configuration"  : {
        <data>
    }
    "edge-locations"  : [
        <data>
    ]
},
"segments": [
    {
        "name": "dev",
        "require-attachment-acceptance"  : false
    },
    {
        "name": "test",
        "edge-locations":  ["central"]
    },
    {
        "name": "prod",
        "isolate-attachments": true
    },
```

TABLE 1-continued

```
],
"segment-actions" : [
    {
        "action": "create-route",
        "destination-cidr-blocks" : ["0.0.0.0/0"],
        "segment": "prod",
        "destinations": <data>
    }
]
"attachment-policies" : [
    {
        "rule-number": 1000,
        "conditions": [ {
            "type": "tag-exists",
            "key": "dev"
        }],
        "action": {
            "association-method": "tag",
            "tag-value-of-key": "dev"
        }
    },
]
}
```

At [B] the control server 112 can evaluate the policy data 300 to determine the actions needed to provision the VPC-WAN. Using the example policy data 300 in Table 1, the control server 112 may evaluate the "core-network-configuration" section, the "segments" section, the "segment-actions" section, the "attachment-policies" section, or some subset thereof as defined within the policy data 300 and as needed to provision the VPC-WAN.

The "core-network-configuration" section may define the high-level definition of a core network (e.g., the portion of the VPC-WAN that is within the cloud provider network). For example, it may specify one or more regions in which to operate, and regional routing settings.

The "segments" section may define the segments to be implemented. Each segment may be implemented as a completely separated routing domain. This section may be used to provide descriptions, change defaults, provide explicit regional operational and route filters, and the like for each segment of the VPC-WAN. The names defined for each segment may be used in other sections, such as the "segment-actions" and "attachment-policies" sections. In some embodiments, defaults that may be overridden and other configuration settings that may be set for a given segment include: an optional definition of "edge-locations" for the segment, when the segment is restricted to fewer than all available edge locations (e.g., regions) defined in the "core-network-configuration" section; an optional "isolate-attachments" setting that specifies whether attachments on the same segment can communicate with each other (e.g., a sandbox segment, such as a development segment in which VPCs should be prohibited from communicating with each other); a "require-attachment-acceptance" setting that specifies whether isolated networks are automatically approved or require acceptance in order to be attached to the segment; a "deny-filter" setting that will prune routes from listed segments after routes have been shared, resulting in prohibition of the two segments from sharing routes with each other; and/or an "allow-filter" setting that will only allow routes from listed segments.

The "segment-actions" section may define routing behavior between segments. In some embodiments, attachments may only communicate with other attachments in the same segment by default, thus ensuring complete isolation of segments. The "segment-actions" section may be used to create connectivity. In some embodiments, segment actions may include a "share" action that enables attachments from two different segments to reach each other. For example, if a segment is set to "isolate-attachments" (e.g., in the "segments" section described above), attachments may not be able to communicate via the segment with any other attachment on the same segment, nor with any other segment (when by default segments are isolated from each other). The "share" action creates routes between attachments in the segments listed for the action. This may be useful to, e.g., set up a shared resources segment that may be reached from one or more other segments. In some embodiments, segment actions may include a "create-route" action to create static routes in the segment.

The "attachment-policies" section may be used to define how attachments are mapped to a segment. For example, an isolated network may be attached to a segment by specifying particular of the isolated network such as identifier. This process may be used to manually manage attachments. In some embodiments, instead of manually associating a segment to each attachment, attachments may be tagged with a defined tag to associate the attachment with the corresponding segment. The "attachment-policies" section may include one or more rules, each of which may include one or conditions to automatically determine when an action is to be taken related to attaching a particular isolated network to a particular segment. Some types of conditions may include a "type," "operator," "value," and/or "key" for use in evaluating the rules. For example, a rule may be a string-matching rule that specifies any attachment with a tag of a particular key (e.g., "environment") that satisfies a conditional operator with respect to a value (e.g., "equals" and "production") is to be automatically attached to a corresponding segment (e.g., the "production" segment). Additional examples of actions may include whether acceptance from a designated entity (e.g., an administrator of the VPC-WAN) is required for attachment.

The example policies, rules, and actions shown in Table 1 and described herein are illustrative only, and are not intended to be limiting, required, or exhaustive. In some embodiments, additional and/or alternative policies, rules, and actions may be implemented.

At [C] the control server 112 may provision the VPC-WAN based on evaluation of the policy data 300. To provision the VPC-WAN, the control server 112 may assign one or more gateway nodes in each region encompassed by the VPC-WAN. Within individual regions, the control server 112 may generate region-specific segment identifiers for use by the gateway nodes to differentiate packets in the various segments that may encompass the respective regions. For example, within region 202, there are three segments 210, 212, and 214. A separate segment identifier may be generated for each of the segments, and the gateway node 140A may be configured with separate routing data (e.g., separate route tables) for each of the segment identifiers. In some embodiments, multiple gateway nodes 140 may configured in this way, such as when the region is composed of multiple AZs as described herein.

Across regions, the control server 112 may implement policies within the gateway nodes so that they can determine appropriate routing data to use and route packets for specific segments accordingly. The policy-based routing may rely on metadata within packet headers indicating the segment identifier of the segment from which that packet was sent, as described in greater detail below. Additional polies may be implemented based on the policy data 300, such as application of route filters (e.g., based on deny-filter and/or allow-filter data), static route sharing, and the like.

In some embodiments, the policy data 300 may specify specific isolated networks to be attached to specific segments instead of—or in addition to—dynamic tag-based attachments that will be evaluated at a later time. Based on such assignments, the control server 112 may configure the attachments (e.g., by adding routes to segment route tables, configuring security settings, or the like).

Once the VPC-WAN has been configured using policy data 300, the client may begin attaching isolated networks to segments and transmitting data across the network. Illustratively, the data may originate from within or outside of the cloud provider network, and/or may be directed to a destination that is within or outside of the cloud provider network. For example, an on-premise network 150 may transmit data to a different on-premise network 150, or to an in-cloud VPC 230, or vice versa, via the VPC-WAN.

At [D], the control server 112 may receive attachment data 302 regarding an attachment operation to be performed. In some embodiments, a user (e.g., administrator) affiliated with the client or a third-party entity may initiate attachment of an isolated network to the VPC-WAN via an application programming interface ("API"), a graphical user interface ("GUI"), or by some other interface. For example, the client may configure a VPC 232 and add a tag to the VPC 232 such that an attachment policy of the policy data 300 is triggered.

At [E], the control server 112 may evaluate the data regarding the attachment operation to be performed (e.g., data identifying the isolated network, a tag associated therewith, etc.) with respect to the policy data 300 in order to determine how the attachment is to be configured. The control server 112 may then configure the attachment at [F]. For example, routing data for the attachment may be added to a segment-specific route table of the gateway node 140A.

Figure 4:
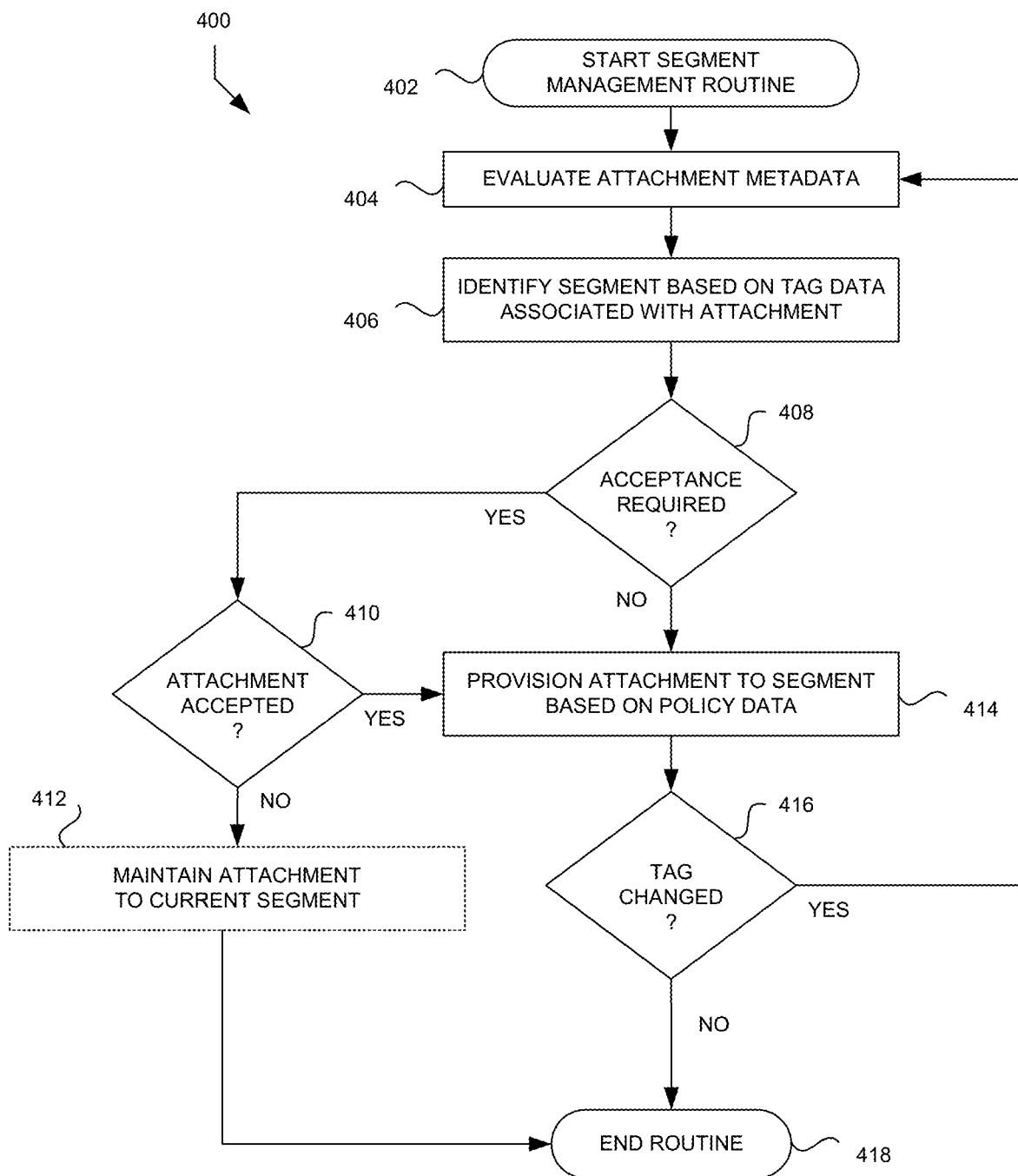
FIG. 4 is a flow diagram of an illustrative routine that may be executed to provision and manage a network and segments according to some embodiments.

FIG. 4 is a flow diagram of an example routine 400 that a control server 112 may execute to manage attachment of isolated networks to segments of VPC-WANs according to some embodiments. Advantageously, the routine 400 makes use of tags associated with isolated networks and segments in order to provide dynamic attachments that may be changed when the underlying attachment policy changes (e.g., when there is a change in an attachment rule) and/or when a tag associated with an isolated network is changed.

The routine 400 beings at block 402. In some embodiments, routine 400 may begin in response to an event, such as startup of operation of a control server 112, receipt of data regarding initiation of an attachment, or in response to some other event.

At block 404, the control server 112 or some other module or component may evaluate attachment metadata associated with the attachment operation. The attachment metadata may be associated with the isolated network to be attached to the VPC-WAN. For example, the attachment metadata may include a unique identifier of the isolated network, a tag, other data, or some combination thereof.

At block 406, the control server 112 or some other module or component may identify a segment to which the isolated network is to be attached based on tag data associated with the isolated network. For example, the control server 112 may evaluate policy data 300 and identify an attachment rule that the tag data and/or other attachment metadata satisfies.

At decision block 408, the control server 112 or some other module or component may determine whether acceptance of the attachment is required before it may be completed. In some embodiments, the determination may be based on segment metadata specified in the policy data 300. For example, in the policy data shown in Table 1, a segment named "dev" is associated with the attribute "'require-attachment-acceptance': false." In this case, if the attachment that is the subject of the current iteration of routine 400 is to be made with respect to the development segment 210, then no acceptance may be required, and the routine 400 may proceed to block 414. Otherwise, if acceptance is required, the routine 400 may proceed to decision block 410 where an entity of the client managing the VPC-WAN (e.g., an administrator) is prompted to accept the attachment.

At block 414, the control server 112 or some other module or component may provision the attachment to the associated segment based on the policy data 300. Provisioning the attachment may involve incorporating, into routing data associated with the segment, routes to destinations within the isolated network.

At decision block 416, the control server 112 or some other module or component may determine whether a tag association of the isolated network has changed. For example, a user may reconfigure the isolated network or otherwise change the tag with which the isolated network is associated. Such a configuration change may affect the attachment of the isolated network, such as by changing the segment to which the isolated network is attached, or changing the attributes of the connection itself. If the tag has changed, the routine 400 may return to block 404. Otherwise, if the tag is not changed, the routine 400 may terminate.

Returning to block 404, the control server 112 may evaluate attachment metadata, and at block 406 the control server may identify a segment based on tag data associated with the attachment. At decision block 408 the control server 112 may determine whether acceptance is required for the changed attachment configuration, and at decision block 410 the control server may determine whether acceptance data has been received indicating the attachment has been accepted. In some embodiments, if the attachment has not been accepted, the routine 400 may proceed to block 412 where the isolated network remains attached to its current segment, rather than being detached and effectively removed from the VPC-WAN.

Figure 5:
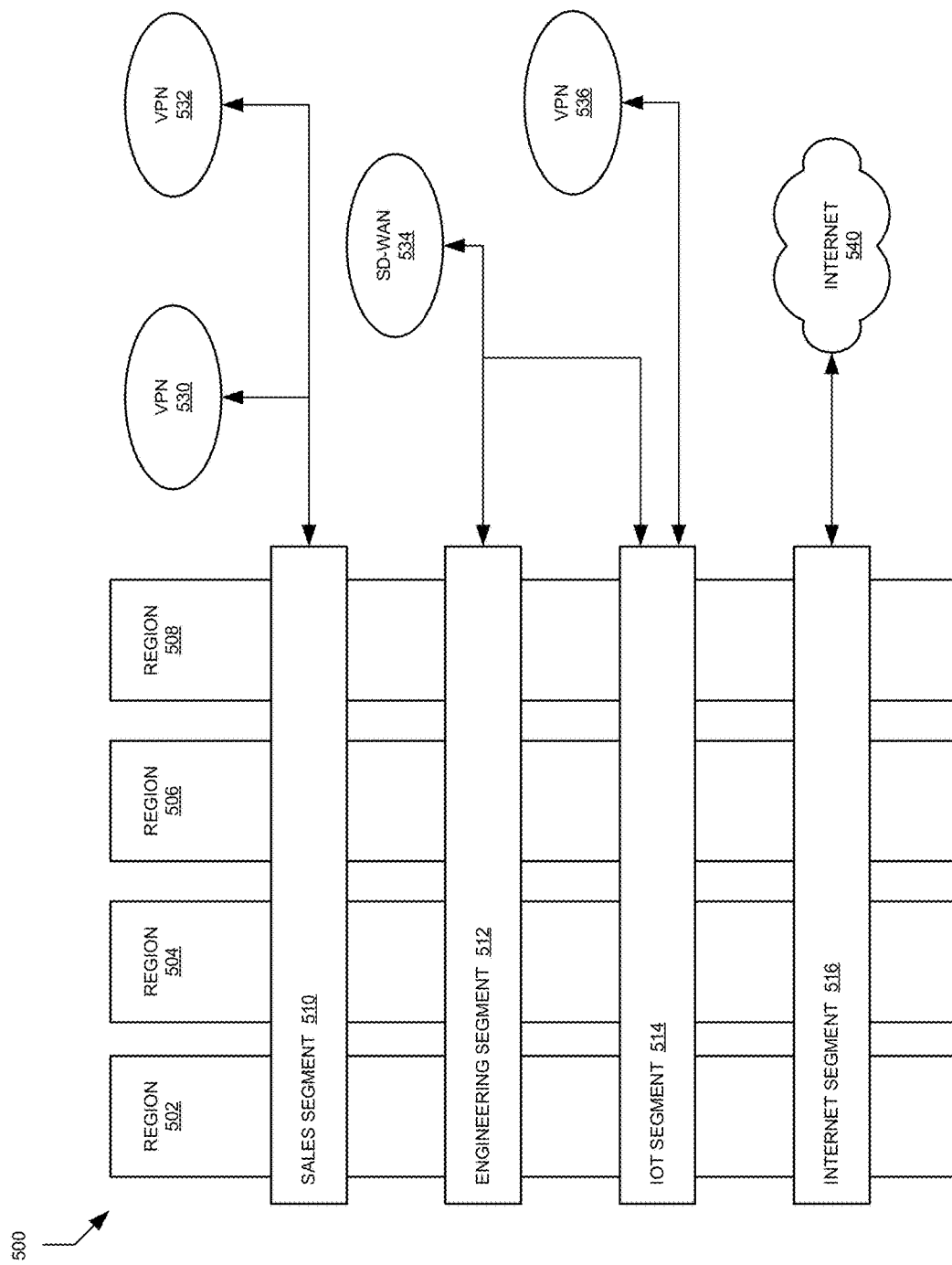
FIG. 5 is a block diagram of an illustrative cloud-based virtual private wide area network in which multiple segments have been provisioned according to some embodiments.

FIG. 5 illustrates another example VPC-WAN 500 implemented at least in part using hardware and services of the cloud provider network. The VPC-WAN 500 is implemented as "global" WAN that encompasses multiple regions of the cloud provider network 100 and uses the cloud provider network 100 infrastructure to transport data between client on-premise networks 150 and/or third-party networks 160, without necessarily using other compute or storage resources of the cloud provider network 100. For example, this VPC-WAN may have no connectivity to any VPC hosted within the cloud provider network 100. Rather, it uses the cloud provider network 100 as transport between client on-premise networks 150 and for internet access.

The example VPC-WAN 500 encompasses multiple regions of the cloud provider network 100: a first region 502, a second region 504, a third region 506, and a fourth region 508. The regions may correspond to different geographic regions, such as different neighborhoods, cities, counties, states, provinces, countries, and/or continents. In addition, the VPC-WAN 500 includes four segments: a sales segment 510, an engineering segment 512, an internet-of-thing ("IoT") segment 514, an internet segment 516.

There are several isolated networks attached to the segments of the VPC-WAN 500, including: VPN 530 and VPN 532 attached to sales segment 510 and providing tunnels to/from different client on-premise networks; SD-WAN 534 attached to engineering segment 512 and IoT segment 514 and providing access for one or more client on-premise networks; and VPN 536 attached to IoT segment 514 and providing access for one or more client on-premise networks. Table 2 below includes an example of policy data that may be used to define and implement a VPC-WAN such as VPC-WAN 500.

TABLE 2

```
{
    <core network configuration data>
    "segments": [
        {"name": "sales"},
        {"name": "testing"},
        {
            "name": "iot",
            "isolate-attachments": true
        },
        {"name": "internet"},
        {"name": "engineering"}
    ],
    "segment-actions": [
        {
            "action": "share",
            "mode": "attachment-route",
            "segment": "internet",
            "share-with": ["sales"]
        },
        {
            "action": "share",
            "mode": "attachment-route",
            "segment": "iot",
            "share-with": ["engineering"]
        },
    ],
    "attachment-policies": [
        }
            "rule-number": 1000,
            "conditions": [
                {
                    "type": "tag-exists",
                    "key": "Assign-to"
                }
            ],
            "action": {
                "association-method": "tag",
                "tag-value-of-key" : "Assign-to"
            }
        }
    ]
}
```

In this example, computing resources in an on-premise network mapped to VPN 530 or 532, attached to sales segment 510, are permitted to access the internet due to the first "share" action which results in a sharing of routes between the segments. IoT segment 514 is under security scrutiny, so attachments within IOT segment 514 cannot reach each other (e.g., SD-WAN 534 cannot communicate with VPN 536 via IoT segment 514). However, SD-WAN 534 may have been deployed to the on-premise engineering networks and parts of the on-premise IoT network. Engineers may require direct access to the on-premise IoT network, which in this example is implemented using a mixture of VPN 536 and SD-WAN 534. In some cases, the SD-WAN 534 will take a direct route between on-premise sites. In other cases, such as when traffic is to cross the on-premise engineering network and on-premise IoT network, the SD-WAN 534 may use the VPC-WAN 500 as transport.

To reduce effort, the policy data uses the "Assign-to" tag to define which segment new attachments should be mapped to. For example, any time an attachment includes a tag "Assign-to : sales" the attachment will be automatically mapped to the sales segment 510. Because no value is provided for a "require-attachment-acceptance" attribute, the default value will be used thereby requiring all attachments to be approved.

Figure 6:
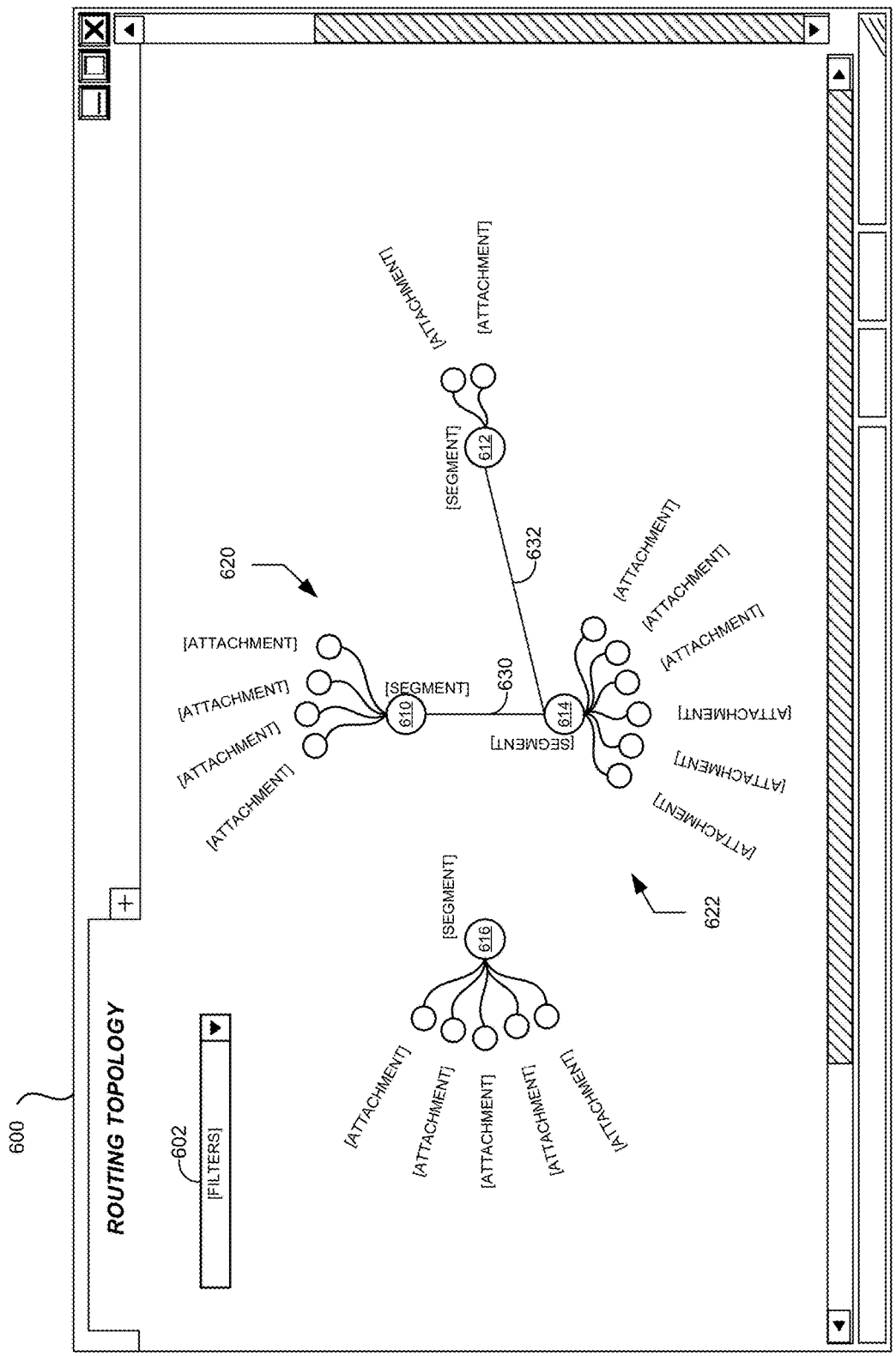
FIG. 6 is a diagram of an illustrative user interface to view and interact with a representation of a cloud-based virtual private wide area network with segments, attachments, and shared routes according to some embodiments.

FIG. 6 illustrates an example user interface 600 that may be used to present a graphical view of a VPC-WAN. In some embodiments, the user interface 600 may be generated as markup language instructions or graphics for a network resource, such as hypertext markup language ("HTML") for a web page.

As shown, a VPC-WAN may be presented as a graph in which display objects, such as nodes 610, 612, 614, and 616, represent respective segments of the VPC-WAN. Attachments are illustrated using display objects, such as node groups 620 and 622 for segment nodes 610 and 614 respectively.

Paths between segments are illustrated by edges 630 and 632, which indicate that the segment represented by node 614 has an available path to and/or from the segments represented by node 610 and/or 612. For example, the segment represented by node 614 may be used to provide shared services to other segments. Node 616 does not have an edge to another node that represents another segment, thus indicating that there is no shared path between the segment represented by node 616 and any other segment.

In some embodiments, a user may apply one or more filters to the user interface 600. For example, filters control 602 may allow selection of various filters, such as filtering the view to a particular on a source and/or destination attachment, segment, etc.

Figure 7:
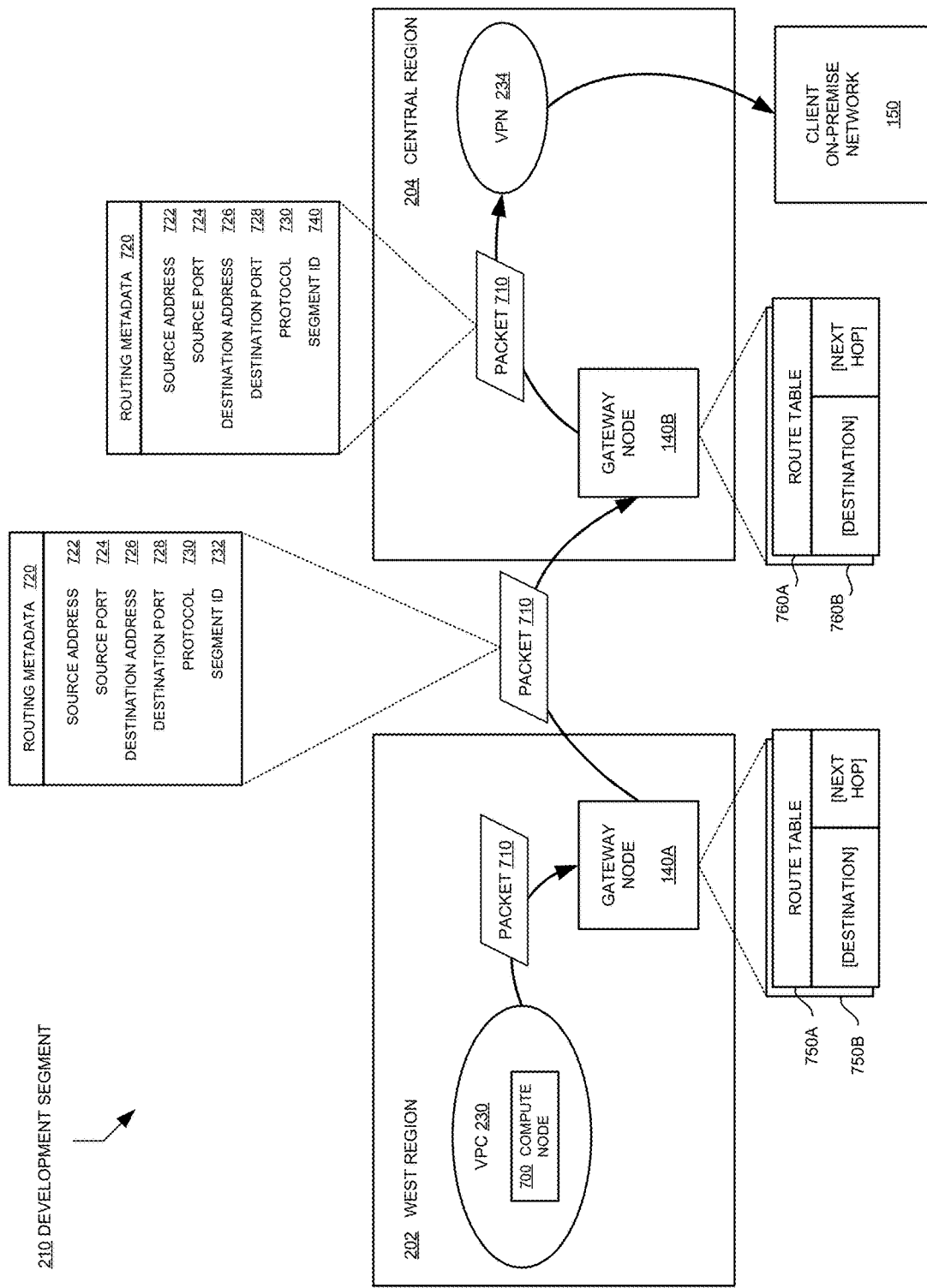
FIG. 7 is a block diagram of illustrative data flows and interactions between gateway nodes and endpoints during policy-based routing of traffic within a virtual cross region segment according to some embodiments.

FIG. 7 illustrates example data flows and interactions between gateway nodes to route a packet within a segment and across regions according to some embodiments.

As shown, a compute node 700 may be located within an isolated network, such as VPC 230, that is within a region, such as west region 202, and is attached to a segment, such as development segment 210. The compute node 700 may initiate transmission of a packet 710 to a destination within the development segment 210, but outside the west region 202.

In some embodiments, the packet 710 transmitted by a compute node 700 to a gateway node 140A within the region 202 may include metadata representing the segment within which the packet is being communicated, or metadata from which the segment can be determined. For example, to facilitate intra-segment cross-region routing of the packet 710, the compute node 700 or a component thereof (e.g., a VM or hypervisor) may include, in routing metadata 720 of the packet 710, a segment identifier 732. As another example, the packet 710 may include a metadata item other than a segment identifier, and a policy may be implemented in the gateway node 140A that maps the metadata item to a particular segment and/or route table for routing the packet 710.

In some embodiments, the routing metadata 720 may be, or be included in, a packet header. For example, some conventional layer 3 networks use a packet header that includes a 5-tuple of routing metadata: source address, source port, destination address, destination port, and protocol. The routing metadata 720 may be augmented with an additional metadata item: a segment identifier. Thus, the packet header of packet 710 may include a 6-tuple of routing metadata 720: source address 722, source port 724, destination address 726, destination portion 728, protocol 730, and segment identifier 732.

Packet 710 may be received by the gateway node 140A for the region in which the packet originates (or in which the packet originally enters the cloud provider network 100).

The gateway node 140A may maintain a plurality of route tables such that routing data for certain segments may be maintained and used separately from routing data for other segments. For example, if the gateway node 140A is configured to route packets for two segments, the gateway node 140A may maintain at least a first route table 750A for a first segment and at least a second route table 750B for a second segment. The different route tables for different segments may include different segment-specific routing data, and may therefore be different from each other. For example, routes specific to the first segment may not be included route table 750B for the second segment (unless the segment is configured to share routes across segments as described elsewhere herein).

Gateway node 140A may be configured to evaluate the routing metadata 720 in the packet 710, and determine the route table to use to route the packet. For example, a policy may specify that the gateway node 140A is to determine which route table to use based on a source and/or destination of a packet, and obtain routing data from the determined route table. In the illustrated example, gateway node 140A may select, from route table 750A, a route to the gateway node 140B in a different region (central region 204). In some embodiments, the route table 750A may include or be associated with a segment identifier for the segment. The gateway node 140A may include the segment identifier in routing metadata 720, shown as segment identifier 732 in the illustrated example.

In some embodiments, a packet 710 may already include metadata representing a segment identifier 732 when received by the gateway node 140A, even when received from a source within or attached to the region in which the gateway node 140A is operating. The gateway node 140A may be configured to evaluate the routing metadata 720 in the packet 710, determine the segment identifier 732 included therein, and select a route table 750A or other set of routing data to be used to route packets in the segment with which the segment identifier 732 is associated. In the illustrated example, gateway node 140A may select a route to the gateway node 140B in a different region, the central region 204.

Gateway node 140B may be configured to evaluate the routing metadata 720 in the packet 710, determine the segment identifier 732 included therein. Based on a routing policy that the gateway node 140B is configured to apply, the gateway node 140B may select route table 760A to be used based on the segment identifier 732. In the illustrated example, gateway node 140B may select a route to a node in a client on-premise network accessible via a VPN 234.

In some embodiments, the segment identifier 732 that is included in packet header routing metadata 720 may be a region-specific segment identifier. For example, the cross-region segment 210 may be composed of a set of region-specific segments. Each region-specific segment may have its own segment identifier. Through application of routing polices at gateway nodes 140A and 140B, the individual region-specific segments may form the basis of a cross-region segment and may, in some cases, be completely transparent to users. In these embodiments, the gateway node in receipt of a packet from a different region may modify the routing metadata to include a segment identifier for the corresponding region-specific segment in the region of the gateway node. For example, gateway node 140B may replace the routing metadata in the original header of the packet 710, by including its own region-specific segment identifier as segment identifier 740.

Although the illustrated example includes different route tables for different segments, the example is illustrative only and is not intended to be limiting. In some embodiments, all routing data used by a given gateway node 140 may be maintained in a single route table, and routes may be tagged with a segment identifier of the segment for which they may be used. In some embodiments, a VPC-WAN may include only a single segment. In such cases, each of the one or more route tables maintained by a gateway node 140 may be used for the single segment. Optionally, a segment identifier of the single segment may still be included in routing metadata 720. In this way, the infrastructure and processing for multiple segments can be extended for use in cases where only a single segment is being used.

Routing data may be exchanged among gateway nodes in different regions. For example, paths that include more than one gateway node may be required for transferring traffic between isolated networks, such as in scenarios in which the traffic has to be transmitted across continental, national, state or regional boundaries. Pairs of gateway nodes may be programmatically associated with each other for such traffic. Such association may be referred to as a "peering attachment" or more simply as "peering," and the associated gateway nodes may be said to be "peered" with one another. To enable cross-region routing of traffic associated with a particular segment, routing data may be associated with an identifier of the segment from the source region so that other regions may be configured to associate traffic from that source region with a correct routing table.

Figure 8:
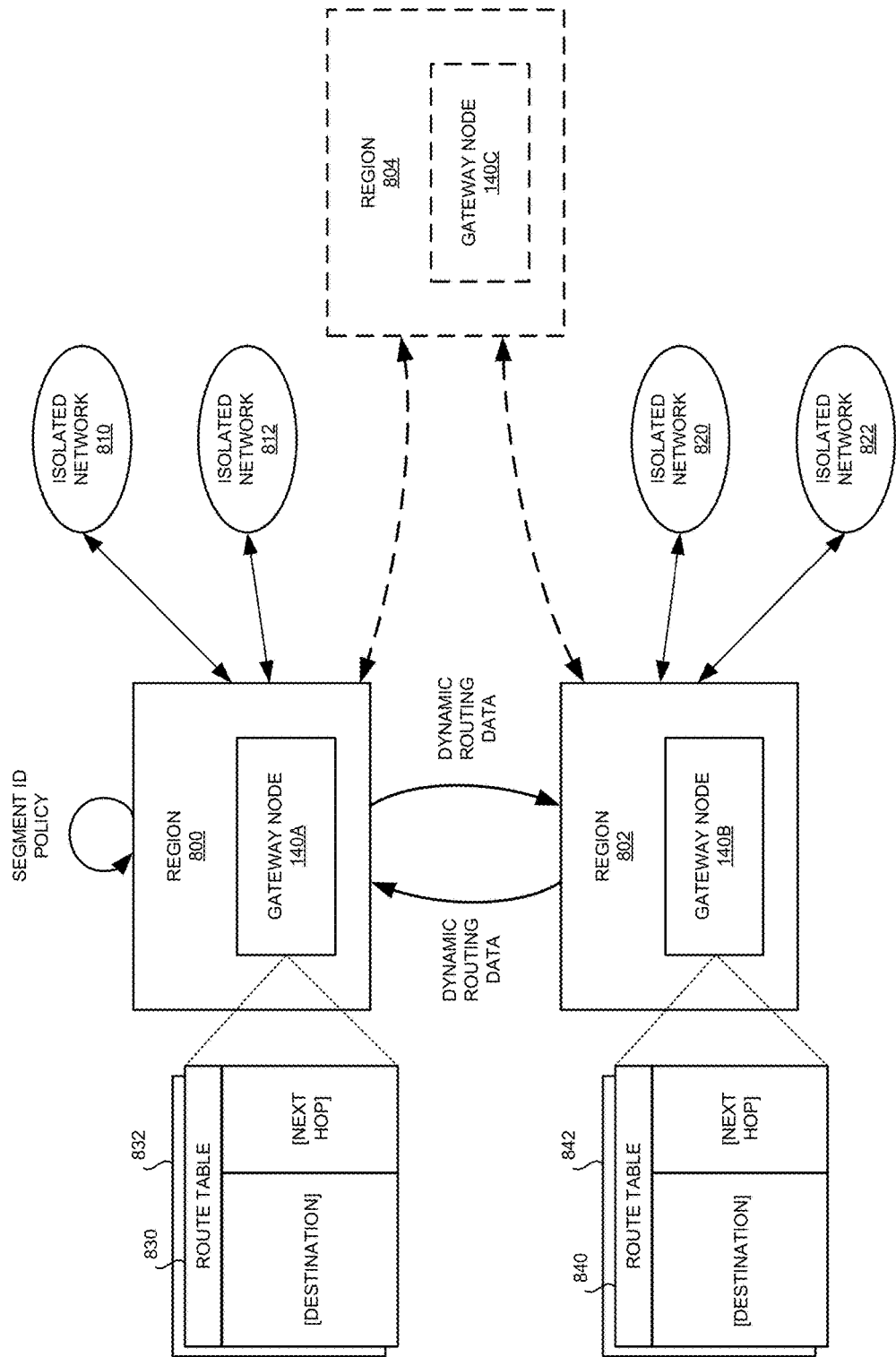
FIG. 8 is a block diagram of illustrative data flows and interactions between gateway nodes during signaling of segment-specific routing data according to some embodiments.

FIG. 8 illustrates an example in which dynamic routing involving the exchange of routing data using an exchange protocol, such as Border Gateway Protocol ("BGP"), may be enabled for a peered pair of gateway nodes. A pair of gateway nodes 140A and 140B may be configured or established, e.g., in response to programmatic requests of one or more clients of the cloud provider network. Illustratively, gateway node 140A may be established in a first geographic region 800 of the cloud provider network 100, and gateway node 140B may be established in a different geographic region 802 of the cloud provider network 100.

The gateway nodes 140A and 140B may be programmatically peered to one another, and to one or more isolated networks, in response to programmatic attachment requests (e.g., submitted by the clients on whose behalf the gateway nodes and the isolated networks are configured). A given attachment with a gateway node may be a peering attachment which associates two gateway nodes, or may belong to one of several isolated network attachment categories, such as: a direct connection attachment in which an isolated network at a client premise connected via a dedicated physical link to the cloud provider network and associated with a gateway node; a VPN attachment in which an isolated network at a client premise is connected via one or more VPN tunnels to the cloud provider network and is associated with a gateway node; an SD-WAN attachment in which a client's on-premise SD-WAN appliance is connected with the cloud provider network and associated with a gateway node; an isolated virtual network attachment which associates an isolated virtual network of a virtualized computing service (e.g., a VPC) with a gateway node; etc.

In the example illustrated in FIG. 8, isolated network 810 (e.g., a VPC hosted within region 800 of the cloud provider network 100) and isolated network 812 (e.g., a client on-premise network accessed using VPN tunnels) may both be programmatically attached to gateway node 140A. In addition, isolated network 820 (e.g., a separate VPC hosted within region 802 of the cloud provider network 100) and isolated network 822 (a direct connection to a client on-premise network) may both be programmatically attached to gateway node 140B. A peering attachment may be set up between gateway nodes 140A and 140B. Illustratively, each of these five attachments may be set up in response to one or more programmatic requests from a client.

Dynamic routing data may be exchanged between gateways 140A and 140B (e.g., in accordance with a version or variant of BGP). In scenarios in which multiple paths are available for transmitting data packets between isolated networks, the routing data may enable more optimal paths to be chosen dynamically at the virtual routers for the application data packets. This type of routing may be referred to as dynamic routing. In some embodiments, any of several different factors such as bandwidth availability, latency, historical congestion patterns, and/or agreements with intermediary or transit network providers may be taken into account at the virtual routers when choosing the next hops or paths for data packets when dynamic routing is enabled.

In addition to enabling the transfer of dynamic routing data, in at least some embodiments a client may provide (e.g., via an API, GUI, policy data document, etc.) a group of one or more dynamic routing protocol configuration settings to be used for the transfers. Such settings may indicate various preferences of the client with respect to aspects of the routing data transfers. One such setting may, for example, include a filter rule to be used to determine whether a route to a particular destination is to be transferred from one gateway node to the other. Another setting may indicate a respective priority to be assigned to individual ones of a plurality of routing-related attributes to select a next hop to a destination, such as: (a) a local preference attribute, (b) a local prefix origin attribute, (c) an autonomous system path length attribute, (d) a multi-exit discriminator attribute, or (e) a router identifier attribute. A local preference may indicate the respective preference to be used by a gateway node for different available paths using a numerical value propagated, for example, in route updates from BGP neighbors of the gateway node in the same autonomous region. Clients may use local preference to influence preferred exit points among multiple exit points of an autonomous system. In one embodiment, routes with the highest local preference values (among the available alternate routes) may be selected for packets by a gateway node. A local prefix origin attribute may be used at a gateway node to prefer paths that are in an isolated virtual network that is directly attached to the gateway node, when alternative paths that involve other gateway nodes are also available in some embodiments. A gateway node may choose the path with the shortest AS path length (among the available alternate paths) in embodiments in which the AS path length attribute is used. Multi-exit discriminators ("MEDs") may be obtained at a gateway node from BGP neighbors in a different AS in some embodiments, and the gateway mode may choose the path with the lowest MED when alternative paths with different MEDs are available. Numeric router identifiers may be assigned to each gateway node as well as to client-owned hardware routers, SD-WAN appliances and the like in some embodiments; among alternative paths which involve transfers to respective routers, the path of the router with the lowest router identifier may be selected if none of the other attributes being considered leads to a preference in one embodiment. In some embodiments, the client-specified settings may indicate a specific variant and/or version of BGP to be used (e.g., iBGP, eBGP, MP-BGP, and the like) and/or a classless inter-domain routing ("CIDR") block from which an address is to be assigned to a BGP processing engine associated with a gateway node. Other parameters governing the transfer of routing data may be specified by a client in some embodiments (e.g., via an API, GUI, policy data document, etc.).

In some embodiments, to enable dynamic routing data transfer, a BGP processing engine may be established or instantiated for each of the respective gateway nodes. One or more BGP sessions may be initiated between the two processing engines to exchange dynamic routing data that enable network packets to be forwarded by each of the gateway nodes to isolated networks via the other gateway node, in accordance with the configuration settings indicated by the client in the depicted embodiment. Transfers of routing data from one BGP processing engine to the other with respect to various sets of destination endpoints may be referred to as "advertising" the routing data.

Gateway nodes 140A and 140B may each maintain at least one route table associated with the peering attachment between the gateway nodes. In some embodiments, each gateway node may maintain at least one route table for each segment spans the peering attachment (e.g., a segment that spans both geographic regions 800 and 802). For example, a first segment may span region 800 and region 802, and may include the four isolated network attachments: isolated networks 810 and 812 in region 800, and isolated networks 820 and 822 in region 802. A second segment may also span regions 800 and 802, and may include different isolated network attachments (not shown).

To facilitate the policy-based routing that maintains a desired degree of isolation between the segments, gateway node 140A may maintain at least one route table for the first segment—route table 830—and at least one separate route table for the second segment—route table 832 (shown in dotted line). Similarly, gateway node 140B may maintain at least one route table for the first segment—route table 840—and at least one separate route table for the second segment—route table 842 (shown in dotted line). Entries in a given route table may indicate the next hops for various groups of destination endpoints, referred to as destination prefixes. In some embodiments, the individual routing data items may be specified in CIDR format.

With reference to one specific illustrative example, isolated network 810 includes a first set of network endpoints with IP version 4 ("IPv4") addresses in the range A.B.C.D/16 (expressed in CIDR notation). Isolated network 812 includes a second network endpoints with IPv4 addresses in the range A.F.C.D/16. Isolated network 820 includes a third set of network endpoints with IPv4 addresses in the range A.G.C.D/16. Isolated network 822 includes a fourth set of network endpoints with IPv4 addresses in the range K.L.M.N/16. To enable traffic to flow via the peering attachment between the gateway nodes, gateway node 140A (or a component thereof, such as a BGP processing engine) transmits advertisements for A.D.C.D/16 and A.F.C.D/16 to gateway node 140B (or a component thereof, such as a BGP processing engine). Gateway node 140B transmits advertisements for A.G.C.D/16 and K.L.M.N/16 to gateway node 140A in the depicted embodiment. As a result, route table 830 is populated with one entry showing gateway node 140B as the next hop for destinations in the A.G.C.D/16 range or destination prefix, and another entry showing gateway node 140B as the next hop for destinations in the K.L.M.N/16 range. Route table 840 is populated with entries indicating gateway node 140A as the next hop based on advertisements for A.B.C.D/16 and A.F.C.D/16, received from gateway node 140A.

As shown, route tables 830 and 840 also include next-hop entries for the isolated networks attached directly to the corresponding gateway node. In some embodiments, some or all of the isolated networks 810, 812, 820, 822 may include their own gateway nodes and/or BGP processing engines. For example, advertisements for endpoints in isolated network 822 may be transmitted from another BGP processing engine configured within isolated network 822 to gateway node 140B.

With reference to one specific non-limiting example, route table 830 may be established in gateway node 140A when the first segment is provisioned (e.g., based on policy data as described in greater detail above). Route table 830 may be tagged with a region-specific segment identifier for the first segment in region 800. Routes for any isolated networks 810 and 812 attached to the first segment in region 800 may be added to route table 830, and route table 830 may be announced. The announcement of the route table 830 tagged with the region-specific segment identifier of the first segment in region 800 may trigger establishment of a policy within gateway node 140A to use route table 830 for routing any packets that include, in routing metadata, the region-specific identifier for the first segment in region 800. Similarly, route table 840 may be established in gateway node 140B, tagged with a region-specific segment identifier for the first segment in region 802. Routes for isolated networks 820 and 822 attached to the segment in region 802 may be added, route table 840 maybe announced, and a policy may be established within gateway 140B to use route table 840 for routing packets that include, in routing metadata, the region-specific identifier for the first segment in region 802.

When routes from route table 830 are advertised to other gateway nodes of the segment, including gateway node 140B, the other gateway nodes may determine the route table that corresponds the segment with which the advertised routing data is tagged, and add those routes as appropriate to the route table. For example, gateway node 140B may determine that the segment with which the advertised routing data is tagged is the first segment for which route table 840 is maintained. Gateway node 140B may add the advertised routes to route table 840 as appropriate (e.g., based on a selection algorithm), and may also establish a policy within gateway node 140B to use route table 840 for routing any packets received from gateway 140A that include, in routing metadata, the region-specific identifier for the first segment in region 800.

The dynamic routing data (e.g., BGP advertisements) transferred among the gateway nodes may be used to transfer network packets from one isolated network to another. For example, if a packet originating in isolated network 810 is directed to an address in the range for isolated network 822, the packet may include routing metadata indicating a segment identifier of the first segment that includes isolated network 810. Gateway node 140A may determine, based on the segment identifier, to use route table 830 instead of route table 832 to route the packet, and may transmit the packet to gateway node 140B. Gateway node 140B may determine, based on the segment identifier, to use route table 840 instead of route table 842 to route the packet, and may forward the packet to isolated network 822.

In the illustrated example, a third region—region 804 with gateway node 140C—is also part of the first segment. Accordingly, gateway nodes 140A and 140B may advertise routes for the first segment to gateway node 140C, and gateway node 140C may advertise routs for the first segment to gateway nodes 140A and 140B. This implementation maybe referred to as a "full mesh."

In some embodiments, a gateway node in one region may not necessarily advertise, to gateway nodes on other regions, every route in its route table for the region. Rather, some routes may be maintained as "local only" or "community" routes. For example, some routes may be tagged with metadata or otherwise indicated as local routes based on requests from an administrator of the network (e.g., via an API), based on rules in policy data used to configure the segment, or based on some other data. When a gateway node is preparing routing data to be advertised, local routes may be filtered out. However, the routes may be used within the region to route data to/from various endpoints. In some embodiments, an entire isolated network (e.g., VPN, VPC, etc.) may be treated as a "local only" or "community" attachment to the segment. For example, an administrator of the network may, via an API and/or rules in policy data, define the segment as a local segment. As a result, all routes to endpoints in the attachment may be tagged with metadata indicating them as local routes.

Although only four isolated networks and three regions are shown, and each region is shown with one gateway node, the example is illustrative only and is not intended to be limiting, required, or exhaustive. In some embodiments, additional or fewer isolated networks, regions, segments, and/or gateway nodes may be used.

Figure 9:
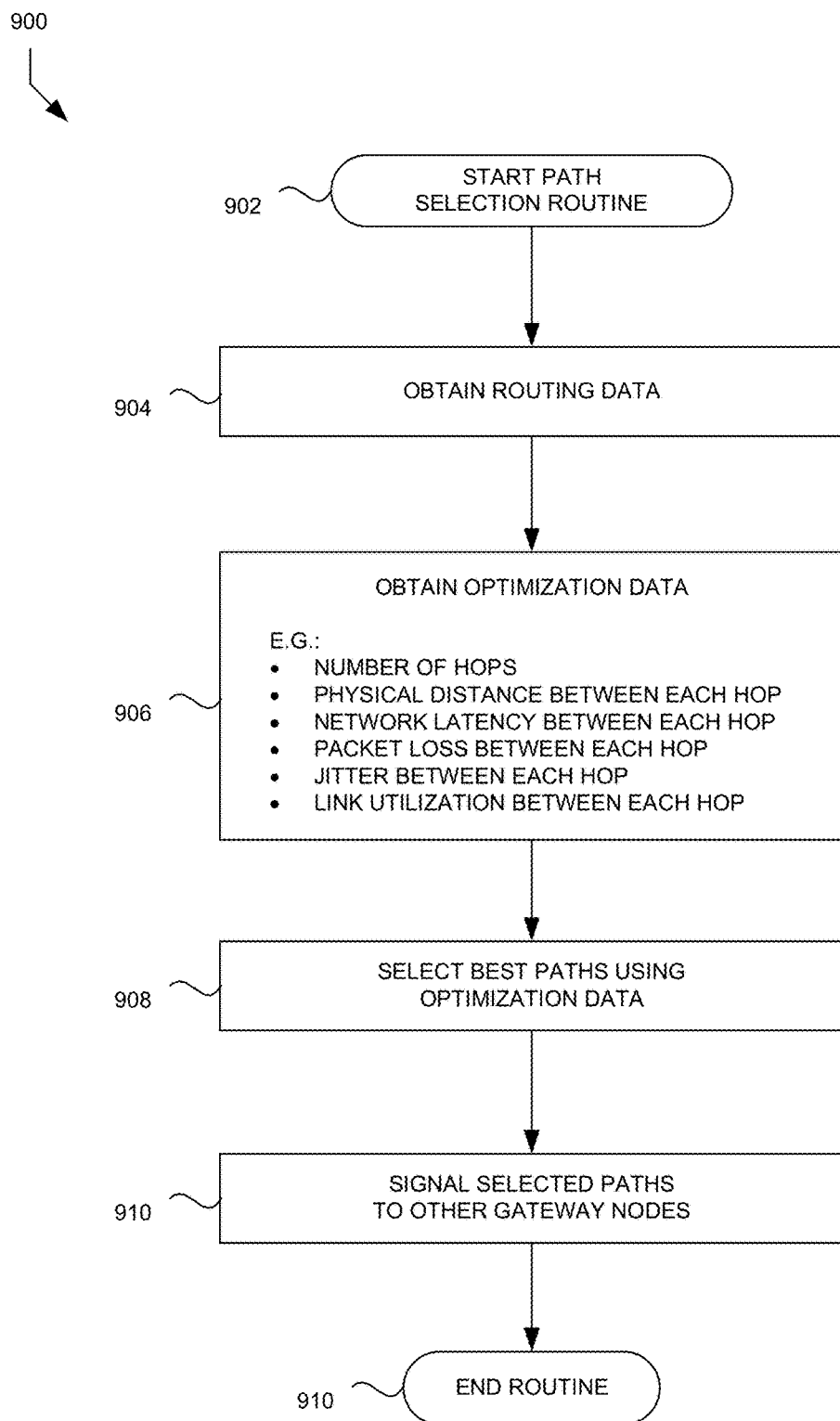
FIG. 9 is a flow diagram of an illustrative routine that a gateway node may execute to select a best path from among multiple paths to a destination according to some embodiments.

FIG. 9 is a flow diagram of an example routine 900 that a gateway node 140 may execute to manage selection of paths and generation of routing data according to some embodiments. Advantageously, the routine 900 makes use of optimization data, including dynamic metrics, to select the best path to a destination in a more dynamic and optimized way then done using conventional methods alone, such as the BGP best path selection algorithm. For example, because the cloud network provider provides a cross-region network using multiple paths between regions (up to and including a full mesh between regions), there are multiple possible paths between any two regions and conventional metrics may not necessarily choose the best path from a latency and/or cost standpoint. By incorporating metrics such as number of hops, physical distance between each hop, network latency between each hop, packet loss between each hop, jitter between each hop, link utilization between each hop, or the like, the selected path may perform better than would otherwise be the case.

The routine 900 beings at block 902. In some embodiments, routine 900 may begin in response to an event, such establishing a dynamic routing data exchange session at a gateway node 140.

At block 904, the gateway node 140 (or some other module or component) may obtain routing data. The routing data may be provided by one or more sources, such as a client (e.g., a client managing a VPC-WAN and/or a segment thereof), one or more other gateway nodes, some other source of routing data, or any combination thereof. Illustratively, at least a portion of routing data may be received in connection with an advertisement of another gateway node 140 (e.g., a gateway node in different region than the region in which the gateway node executing the current iteration of route 900 is located).

At block 906, the gateway node 140 (or some other module or component) may obtain optimization data. In some embodiments, the optimization data may include: a number of hops associated with a path, a physical distance between each hop associated with a path, a network latency between each hop associated with a path, a degree of packet loss between each hop associated with a path, a degree of jitter between each hop associated with a path, a degree of link utilization between each hop associated with a path, other optimization data, or any combination thereof. The optimization data may be obtained from one or more sources, any, all, or none of which may be external to the gateway node 140 executing the current iteration of the routine 900. For example, the physical distance between each hop may be determined and maintained by a separate management system, and provided to gateway nodes as optimization data for path selection. As another example, the degree of latency, packet loss, or jitter between two hops may be determined by devices (e.g., including the gateway node 140) participating in the hop, and may be reported to sources, destinations, routers, or a management system.

At block 908, the gateway node 140 (or some other module or component) may select the best path to each destination from among multiple available paths to each destination using the optimization data. In some embodiments, selection of the best path using the optimization data may be performed using a modified version of the BGP best path selection algorithm, or may be performed using a custom algorithm. For example, certain attributes evaluated during the BGP best path selection algorithm (e.g., weight, local preference, local prefix origin, AS path length, MED, router identifier) may be preceded by, followed by, or replaced by one or more metrics or other attributes of optimization data (e.g., number of hops, physical distance between each hop, network latency between each hop, packet loss between each hop, jitter between each hop, link utilization between each hop, or the like).

At block 910, the gateway node 140 (or some other module or component) may signal the selected paths to other gateway nodes 140 or otherwise exchange routing data with other gateway nodes 140 (e.g., as part of the dynamic routing data exchange session). By signaling the selected paths to other gateway nodes 140, best path selection process is done in a distributed manner. For example, each gateway node may obtain optimization data, perform best path selection locally, and inform all other peers. The overall VPC-WAN is able to find the best path using this distributed routing system. Due to the distributed nature of this system, it may be highly available without any single point of failure.

In some conventional systems, cross-region traffic may be routed point-to-point through a specific pair of gateway nodes of a client's choice. However, traffic can traverse through multiple regions before reaching destinations. Moreover, although some conventional systems require traffic to have at least one endpoint within a cloud provider network, a VPC-WAN 200 as described herein may have both endpoints external to the cloud provider network 100 (e.g., in different client on-premise networks 150, third party networks 160, some combination thereof, etc.). In such implementations, the distributed system of gateway nodes implementing optimized best path selection may influence how client on-premise traffic is sent to the cloud provider network 100 and which is the best entry point for the traffic. For example, in the case of a direct connection attachment to a client on-premise network, traffic may be sent via the direct connection by default. However, if there are multiple attachments to the client on-premise network, the optimized best path selection may result in a best path from a different attachment, different client on-premise network, etc.

With reference to an illustrative example, there may be traffic going between two different regions of a VPC-WAN, and it may be roughly the same distance, from a networking and/or geographic standpoint, to route traffic through either region to a particular destination in a third region. The optimized best path selection performed using the distributed system and optimization data may choose the best path under observed network conditions. As another illustrative example, if something breaks the connection between two regions of an otherwise full mesh configuration, one region may no longer have routes to/through the other region but may still have routes for each other region. The optimized best path selection performed using the distributed system and optimization data may choose the best path to the best other region to serve as an intermediary. As a further illustrative example, there may be a heavily-used segment of physical network infrastructure between two regions that is causing congestion. The optimized best path selection performed using the distributed system and optimization data may choose the best path from one of the two regions to the other of the two regions via an intermediary rather than using a direct path.

The routine 900 may terminate at block 910.

Figure 10:
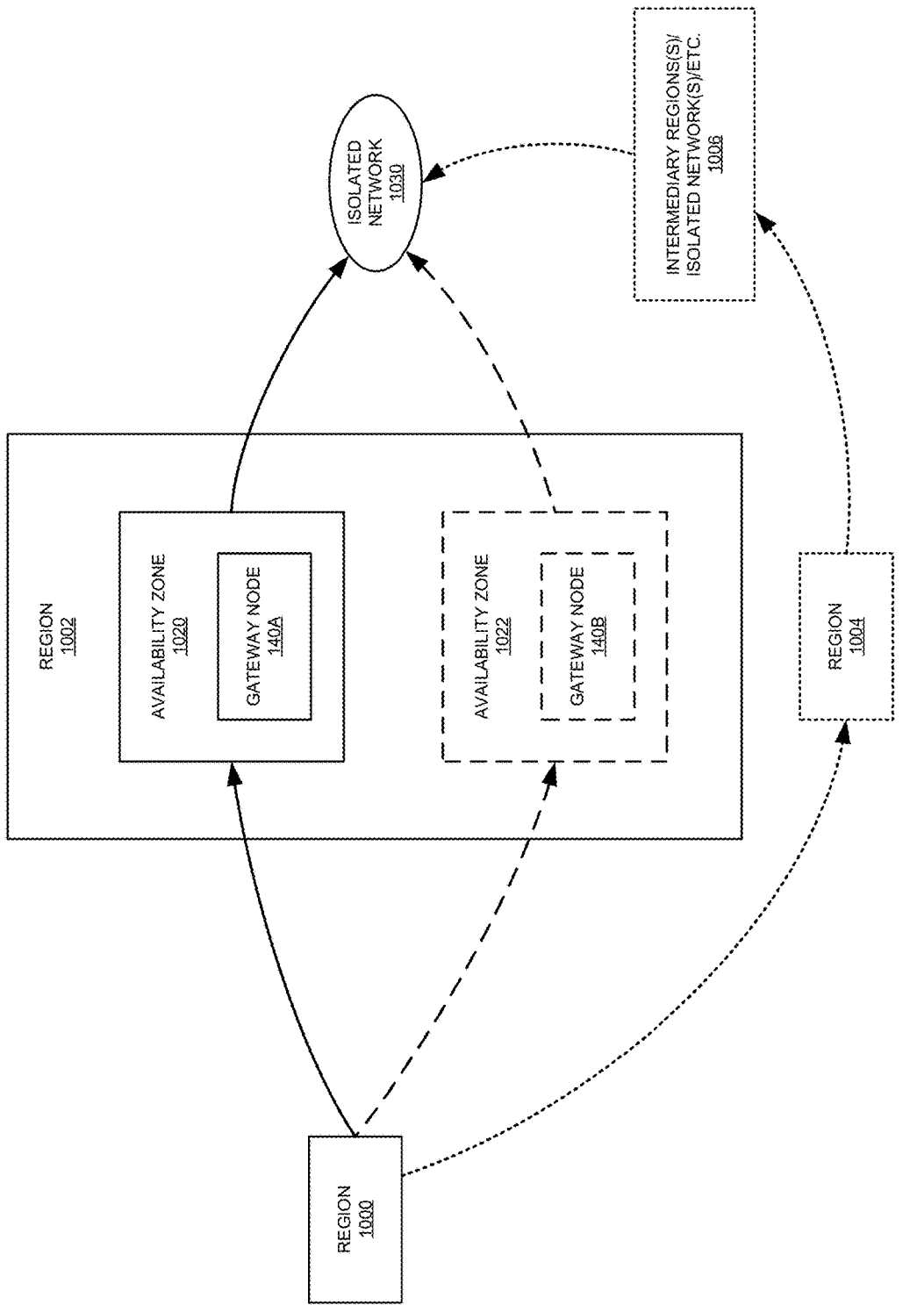
FIG. 10 is a block diagram of illustrative data flows and interactions during routing of traffic within, to, or through a region having multiple availability zones according to some embodiments.

FIG. 10 illustrates a region 1002 with two availability zones 1020, 1022. Each availability zone may have one or more gateway nodes. For example, availability zone 1020 may include gateway node 140A, and availability zone 1022 may include gateway node 140B. The gateway nodes in each availability zone of a region may include the same routing data for redundancy.

When traffic from another region, such as region 1000, is to pass through region 1002 on the way to an endpoint in an attachment to region 1002, such as isolated network 1030, multiple communication sessions may be established: one to each of the availability zones 1020, 1022. The source region 1000 may use equal cost multipath ("ECMP") routing to balance the load across both availability ones to the isolated network 1030. In addition, and separate from the load balancing aspect, the multiple redundant availability zones serve to ensure availability of the computing resources of the region 1002. If one of the availability zones, such as availability zone 1020 becomes unviable, traffic may still be able to reach the isolated network 1030 through the other availability zone 1022, as indicated using dashed line.

Similarly, because gateway nodes in regions of a particular segment exchange routing data (e.g., using the protocol described above), a complete outage of one region may not prevent traffic from being routed to a destination in an isolated network. For example, all availability zones of region 1002 are inaccessible, traffic may be routed to a different region, such as region 1004, and/or through any other intermediary region(s), isolated networks, etc. 1006 as need to reach isolated network 1030.

Figure 11:
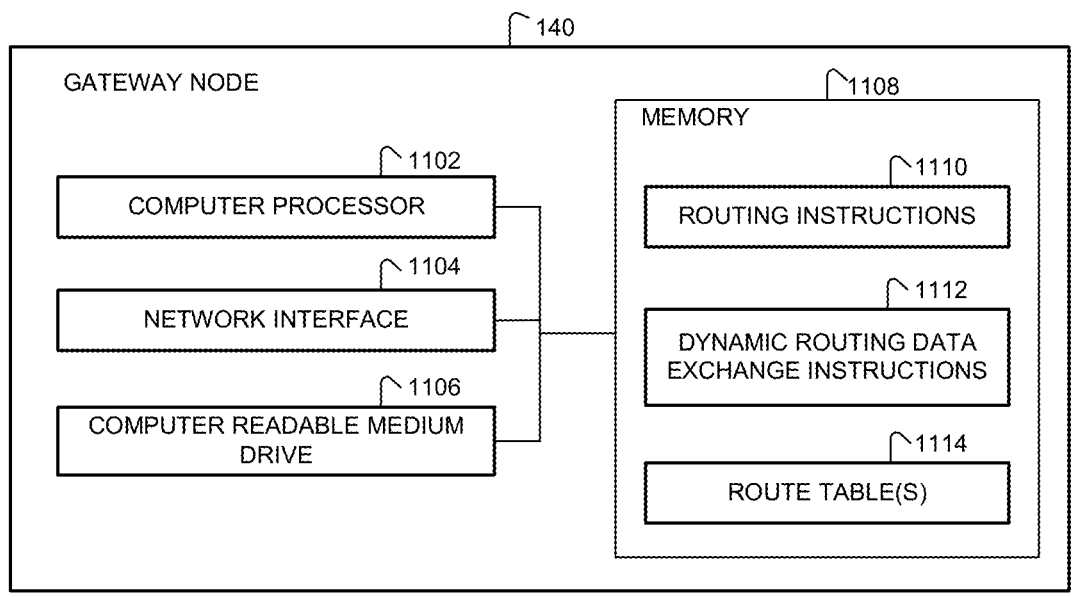
FIG. 11 is a block diagram of an illustrative gateway node configured to implement features of some embodiments.

FIG. 11 illustrates various components of an example gateway node 140 configured to implement various functionality described herein. The gateway node 140 may be a physical host computing device on which a gateway is implemented, such as a compute server 122.

In some embodiments, as shown, a gateway node 140 may include: one or more computer processors 1102, such as physical central processing units ("CPUs"); one or more network interfaces 1104, such as a network interface cards ("NICs"); one or more computer readable medium drives 1106, such as a high density disk ("HDDs"), solid state drives ("SSDs"), flash drives, and/or other persistent non-transitory computer-readable media; and one or more computer readable memories 1108, such as random access memory ("RAM") and/or other volatile non-transitory computer-readable media.

The computer readable memory 1108 may include computer program instructions that one or more computer processors 1102 execute and/or data that the one or more computer process 1102 use in order to implement one or more embodiments. For example, the computer readable memory 1108 can store routing instructions 1110 for routing packets based on routing metadata and data in one or more route tables 1114. As another example, the computer readable memory 1108 includes dynamic routing data exchange instructions 1112 for exchanging routing data with other gateway nodes.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a first gateway node associated with a first geographic region of a provider network, wherein a virtual private cloud-based wide area network is implemented on the provider network and wherein the first gateway node is configured to use a first route table to route traffic associated with a first segment of the virtual private cloud-based wide area network and a second route table to route traffic associated with a second segment of the virtual private cloud-based wide area network, wherein traffic associated with the first segment is isolated from traffic associated with the second segment based at least partly on the first route table being distinct from the second route table; and
    a second gateway node associated with a second geographic region of the provider network, wherein the second gateway node is configured to use a third route table to route traffic associated with the first segment and a fourth route table to route traffic associated with the second segment;
    wherein the first gateway node is further configured to:
        send, to the second gateway node, first routing data representing at least a portion of routes identified in the first route table;
        update the first route table based on second routing data, received from the second gateway node, representing at least a portion of routes identified in the third route table;
        receive a packet associated with routing metadata representing at least a first source address in the first geographic region, a destination address in the second geographic region, and an identifier of the first segment;
        identify the identifier of the first segment in the routing metadata;
        determine, based at least partly on an assignment of the identifier directly to the first route table, to route the packet to the second gateway node using the first route table; and
        route the packet to the second gateway node using the first route table;
    wherein the second gateway node is further configured to:
        send the second routing data to the first gateway node;
        update the third route table based on the first routing data received from the first gateway node;
        receive the packet from the first gateway node; and
        route the packet to the destination address using the third route table based at least partly on the identifier of the first segment.

2. The system of claim 1, wherein the second gateway node is further configured to modify the routing metadata associated with the packet to generate modified routing metadata, wherein the modified routing metadata represents a second identifier associated with the first segment.

3. The system of claim 1, wherein the first gateway node is further configured to select a path to the destination address from a plurality of paths to the destination address, wherein the path is selected based on at least one of: a number of hops associated with the path, a physical distance between each hop associated with the path, a network latency between each hop associated with the path, a degree of packet loss between each hop associated with the path, a degree of jitter between each hop associated with the path, or a degree of link utilization between each hop associated with the path.

4. The system of claim 1, further comprising a third gateway node associated with the first geographic region, wherein the third gateway node is configured to use a fifth route table to route traffic associated with the first segment and a sixth route table to route traffic associated with the second segment, wherein the first gateway node is in a first availability zone of the first geographic region, and wherein the third gateway node is in a second availability zone of the first geographic region.

5. A computer-implemented method comprising:
    under control of a first gateway node associated with a first geographic region of a provider network:
        receiving a packet comprising first routing metadata representing a first destination address and a first segment identifier, wherein the first segment identifier is associated with a first segment of a plurality of segments of a private wide area network implemented on the provider network;
        identifying the first segment identifier in the first routing metadata;
        determining, based at least partly on an assignment of the first segment identifier directly to a first route table of a plurality of route tables maintained by the first gateway node, to route the packet using the first route table, wherein the first route table is used to route traffic of the first segment, wherein a second route table of the plurality of route tables is used to route traffic of a second segment of the plurality of segments, and wherein traffic associated with the first segment is isolated from traffic associated with the second segment based at least partly on the first route table being distinct from the second route table; and
        transmitting the packet based at least partly on first routing data from the first route table, wherein the first routing data is associated with the first destination address.

6. The computer-implemented method of claim 5, wherein transmitting the packet comprises transmitting the packet to a second gateway node associated with a second geographic region of the provider network.

7. The computer-implemented method of claim 5, wherein transmitting the packet comprises transmitting the packet to a second gateway node associated with an isolated virtual network in the first geographic region.

8. The computer-implemented method of claim 5, further comprising modifying the first routing metadata to produce second routing metadata, wherein the second routing metadata comprises a second segment identifier associated with the first segment, wherein the second segment identifier is a region-specific segment identifier associated with the first geographic region.

9. The computer-implemented method of claim 5, further comprising:
receiving a second packet comprising second routing metadata representing a second destination address and a second segment identifier associated with the first segment;
determining, based at least partly on the second segment identifier, to route the second packet based on the first route table; and
transmitting the second packet based at least partly on second routing data from the first route table, wherein the second routing data is associated with the second destination address.

10. The computer-implemented method of claim 5, further comprising:
receiving a second packet comprising second routing metadata representing a second destination address and a second segment identifier associated with the second segment;
determining, based at least partly on the second segment identifier, to route the second packet based on the second route table; and
transmitting the second packet based at least partly on second routing data from the second route table, wherein the second routing data is associated with the second destination address.

11. The computer-implemented method of claim 5, further comprising sending, to one or more other regions of the provider network, second routing data representing at least a portion of routes identified in the first route table, wherein the one or more other regions are associated with the first segment.

12. The computer-implemented method of claim 5, further comprising updating the first route table based on second routing data, received from a second gateway node in a second region of the provider network, representing at least a portion of routes in a third route table maintained by the second gateway node, wherein the third route table is associated with the first segment.

13. The computer-implemented method of claim 12, wherein updating the first route table comprises selecting a path to the first destination address from a plurality of paths to the first destination address, wherein the path is selected based on at least one of: a number of hops associated with the path, a physical distance between each hop associated with the path, a network latency between each hop associated with the path, a degree of packet loss between each hop associated with the path, a degree of jitter between each hop associated with the path, or a degree of link utilization between each hop associated with the path.

14. The computer-implemented method of claim 5, wherein transmitting the packet based at least partly on the first routing data comprising transmitting the packet to a second gateway node in a first availability zone of a plurality of availability zones of a second region of the provider network, where a second packet is transmitted based at least partly on second routing data to a third gateway node in a second availability zone of the plurality of availability zones.

15. A system comprising a plurality of gateway nodes of a provider network, wherein a first gateway node of the plurality of gateway nodes comprises:
non-transitory computer-readable memory storing executable instructions; and
one or more processors in communication with the non-transitory computer-readable memory and programmed by the executable instructions to at least:
receive a packet comprising first routing metadata representing a first destination address and a first segment identifier, wherein the first segment identifier is associated with a first segment of a plurality of segments of a private wide area network implemented within a shared network infrastructure;
identify the first segment identifier in the first routing metadata;
determine, based at least partly on an assignment of the first segment identifier directly to a first route table of a plurality of route tables maintained by the first gateway node, to route the packet using the first route table, wherein the first route table is used to route traffic of the first segment, wherein a second route table of the plurality of route tables is used to route traffic of a second segment of the plurality of segments, and wherein traffic associated with the first segment is isolated from traffic associated with the second segment based at least partly on the first route table being distinct from the second route table; and
transmit the packet based at least partly on first routing data from the first route table, wherein the first routing data is associated with the first destination address.

16. The system of claim 15, wherein to transmit the packet, the one or more processors are programmed by further executable instructions to transmit the packet to a second gateway node associated with a second geographic region of the provider network, wherein the first gateway node is associated with a first geographic region of the provider network.

17. The system of claim 15, wherein to transmit the packet, the one or more processors are programmed by further executable instructions to transmit the packet to a second gateway node associated with an isolated virtual network in a same geographic region of the provider network as the first gateway node.

18. The system of claim 15, wherein the one or more processors are programmed by further executable instructions to modify the first routing metadata to produce second routing metadata, wherein the second routing metadata comprises a second segment identifier associated with the first segment, wherein the second segment identifier is a region-specific segment identifier.

19. The system of claim 15, wherein the one or more processors are programmed by further executable instructions to:
send, to one or more other regions of the provider network, second routing data representing at least a portion of routes identified in the first route table, wherein the one or more other regions are associated with the first segment; and
update the first route table based on third routing data, received from a second gateway node in a second region of the provider network, representing at least a portion of routes in a third route table maintained by the second gateway node, wherein the third route table is associated with the first segment.

20. The system of claim 19, wherein the one or more processors are programmed by further executable instructions to select a path to the first destination address from a plurality of paths to the first destination address, wherein the path is selected based on at least one of: a number of hops associated with the path, a physical distance between each hop associated with the path, a network latency between each hop associated with the path, a degree of packet loss between each hop associated with the path, a degree of jitter between each hop associated with the path, or a degree of link utilization between each hop associated with the path.

* * * * *